United States Patent [19]

Sado et al.

[11] 4,210,895

[45] Jul. 1, 1980

[54] PRESSURE SENSITIVE RESISTOR ELEMENTS

[75] Inventors: Ryoichi Sado, Saitama; Akio Nakamura, Toda, both of Japan

[73] Assignee: Shin-Etsu Polymer Co., Ltd., Tokyo, Japan

[21] Appl. No.: 968,760

[22] Filed: Dec. 12, 1978

[30] Foreign Application Priority Data

Dec. 15, 1977 [JP] Japan .................. 52/151143

[51] Int. Cl.² ........................................ H01R 11/20
[52] U.S. Cl. ........................................ 338/99; 338/114
[58] Field of Search .............. 338/114, 2, 71, 99, 338/100, 101, 104, 106, 109, 96, 223; 200/159 B

[56] References Cited

U.S. PATENT DOCUMENTS

| | | | |
|---|---|---|---|
| 3,398,233 | 8/1968 | De Lizasoain et al. | 338/114 X |
| 3,629,774 | 12/1971 | Crites | 338/99 X |
| 3,960,044 | 6/1976 | Nagai et al. | 338/114 |

*Primary Examiner*—C. L. Albritton
*Attorney, Agent, or Firm*—Hopgood, Calimafde, Kalil, Blaustein & Lieberman

[57] ABSTRACT

Pressure sensitive resistor elements are provided which serve as an on-off switching device and comprise an anisotropically electroconductive sheet which is formed of an insulating rubbery elastomer as a matrix within which many electroconductive fibers are dispersed and oriented in a direction substantially perpendicular to the plane of the sheet, an electrode provided on each surface of the sheet, and an insulating layer interposed between at least one of the electrodes and the sheet. The resistor elements can remain insulating in the absence of a compressive force between the electrodes and contribute to electric conduction in the presence of the compressive force.

3 Claims, 4 Drawing Figures

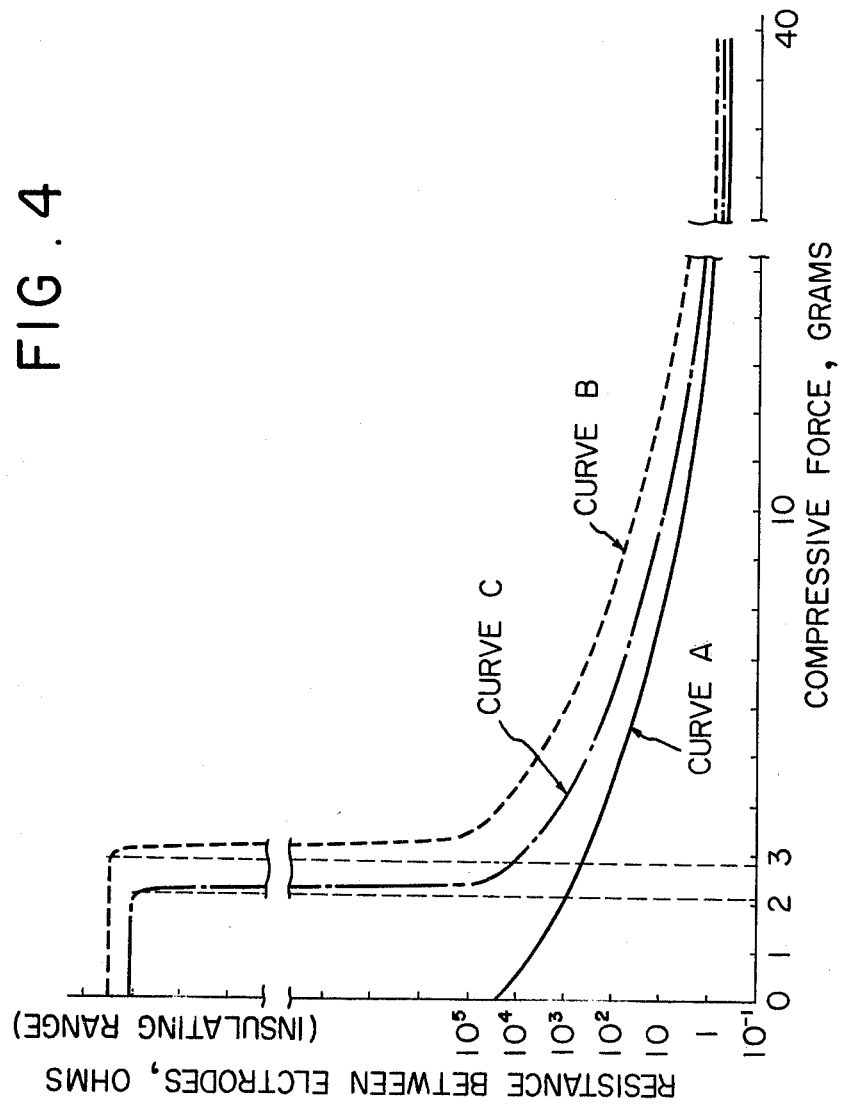

PRESSURE SENSITIVE RESISTOR ELEMENTS

BACKGROUND OF THE INVENTION

The present invention relates to a novel and improved pressure sensitive resistor element.

There are known various types of pressure sensitive resistor elements having different mechanisms for pressure sensitiveness. A typical prior art pressure sensitive resistor element comprises a sheet of an electrically insulating rubbery material as a matrix, a number of electroconductive fibers dispersed in the matrix and oriented in alignment in a direction parallel to the thickness of the sheet, and electrodes provided on both surfaces of the sheet in electric contact. In order to obtain pressure sensitiveness in this type of resistor elements, it is essential that at least part of the electroconductive fibers do not penetrate the sheet from one surface to the other, so that the application of a compressive force between the electrodes brings about decreases in the thickness of the sheet whereby the number of the fibers reaching both surfaces of the sheet increases gradually as the compressive force is increased.

The pressure sensitive resistor elements not only of this type but also of other types have a problem that they exhibit some electric conduction even when no compressive force is applied and cannot be an electric insulator even in the absence of a compressive force. Therefore, it is a common practice that an on-off switching device is provided in series with the pressure sensitive resistor element in order to open the electric circuit. Further, inconvenience and inefficiency have been unavoidable in the assembling of the electric circuit, while sufficient miniaturization of the components cannot be achieved due to the necessity of a separate switching device.

SUMARY OF THE INVENTION

It is therefore an object of the present invention to provide a novel and improved pressure sensitive resistor element with which no on-off switching device is necessitated in the electric circuit to open the circuit because of the function of the resistor element which is an electric insulator in the absence of a compressive force.

The pressure sensitive resistor element of the present invention comprises an anisotropically electroconductive sheet formed of an electrically insulating rubbery elastomer as a matrix, within which a number of electroconductive fibers are dispersed and oriented in alignment in a direction substantially perpendicular to the place of the sheet, an electrode provided on each sheet surface, and an insulating layer formed of an electrically insulating material interposed between at least one of the electrodes and the sheet, the insulating layer having a thickness sufficient to be insulating in the absence of, and to contribute to electric conduction in the presence of, a compressive force between electrodes.

BRIEF DESCRIPTION OF THE DRAWING

FIG. 4 is a graphic showing of the relationships between a compressive force applied between the electrodes and the value of resistance between the electrodes obtained in Examples 1 and 2. Curve A shows the results of a comparative test with a pressure sensitive resistor element having no insulating layer interposed between the electrode and the composite sheet. Curve B shows the results of Example 1 in which a thin layer of an insulating rubbery material was provided between the electrode and the composite sheet. Curve C shows the results of Example 2 in which a fine net of an insulating fiber was provided between the electrode and the composite sheet.

DETAILED DESCRIPTION OF THE PREFERRED EMBODIMENTS

Figure 1:
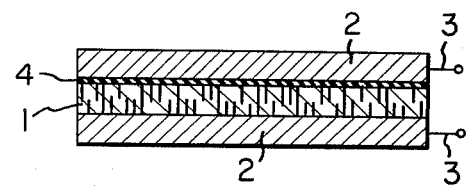
FIG. 1 is a schematic cross-sectional view of a pressure sensitive resistor element of the invention in which a continuous insulating layer is provided between an anisotropically electroconductive composite sheet and one of the electrodes.

The anisotropically electroconductive sheet used in the present invention is a composite material with a matrix of a rubber-like elastomer and numberless fibers of an electroconductive material embedded therein in alignment in the direction substantially perpendicular to the plane of the sheet or parallel to the direction of the thickness of the sheet. The electroconductive fibers have a length distribution such that part of them are long enough to penetrate the sheet from one surface to the other while the rest are not. It is recommended, for example, that the average length of the fibers is in the range from 20 to 80% of the thickness of the sheet.

The electroconductive fibers desirably have a good elasticity. Their examples are fibers, fine wires or hollow filaments of carbon, graphite, metals, e.g. nickel silver, stainless steel, nickel, tungsten and the like, and may include precious metal-plated phosphorus bronze fibers. The diameter of each fiber is usually in the range from 5 to 200 $\mu$m.

The rubbery elastomer as the matrix may be any one of natural rubber and synthetic rubbers, among which especially suitable is a silicone rubber because of its excellent properties in, for example, heat stability, electric characteristics, mechanical strengths, and resistance to chemicals and weathering.

The anisotropically electroconductive composite sheet material may be prepared as follows. The above mentioned electroconductive fibrous material and a rubber compound to be cured into the rubbery elastomer are blended to form a plasticized mixture in which the electroconductive fibers are uniformly dispersed. This process of plasticization blending is performed by use of a suitable conventional blending machine, such as a mixing roller, internal mixer, kneader or the like, so that the individual fibers are uniformly distributed and rendered to have desired lengths. If the fibers all are too long, or remain insufficiently short, their orientation performed in the subsequent step of orientation can hardly be effected to a satisfactory degree and anisotropy in the electroconductivity of the finished composite sheet can not be exhibited to a desirable extent. On the contrary, if the fibers are made too short by performing the blending operations over a longer period of time, the desired electroconductivity may not be obtained in the finished composite sheet material. Therefore, it is recommended that when electroconductive fibers having so high strength that a sufficient reduction of lengths is not obtained by the blending process are used, they should be chopped in a suitable length, e.g. 0.2–10 mm, in advance.

The plasticized mixture obtained by the plasticization blending is then subjected to the process of orientation of the electroconductive fibers. This process is performed by causing plastic deformation to the mixture in a certain direction with stress by use of a screw pump, gear pump, plunger pump or the like, as well as various conventional machines suitable for the fabrication of plastic resins or rubbers, such as extruding machine, injection moulding machine, and calendering machine.

The above-described orientation process brings the electroconductive fibers into a substantially parallel alignment in the direction of the plastic flow of the plasticized mixture. The resulting mixture is obtained in the form of a continuous lengthy rod, pipe, tape, plate or the like, and then integrated into unity as a bundle, followed by solidification by cooling or curing by cross-link formation, and sliced in a plane substantially perpendicular to the orientation of the fibers to produce the desired anisotropically electroconductive sheet-like composite materials having a thickness according to need.

The electrodes suitable for use in the present invention are formed of gold, silver, nickel, nickel silver or the like in the shape of plates, or copper or a copper-based alloy whose surface is treated with plating or vacuum deposition, using a precious metal. They may also be formed of other electroconductive materials, such as electroconductive coating compositions, electroconductive adhesives, electroconductive resins, electroconductive rubbers and the like.

The pressure sensitive resistor element of the present invention can be obtained by integrally providing the above-described electrodes on both opposing surfaces of the above-described anisotropically electroconductive composite sheet, at least one of the electrodes being contacted with the sheet with interposition therebetween of a thin insulating layer, and the other electrode being bonded directly to the surface of the sheet permitting electric conduction through the interface. The electroconductive bonding in this case can be carried out by a convenient press-bonding means, or by placing a layer of a conductive sticking agent or pressure sensitive adhesive between the electrode and the sheet.

The insulating layer interposed between the anisotropically electroconductive composite sheet and one or each of the electrodes is a continuous layer of an insulating material capable of plastic flowing or deformability under pressure, such as a soft gummy rubber compound or a vulcanizate thereof. The insulating layer has a thickness which is critically limited, because a too small thickness brings about an insufficient insulation even in the absence of a compressive force, while a too large thickness requires an excessively high compressive force in order to obtain electric conduction. Besides, the thickness of this insulating layer should be determined in consideration of not only the consistency or hardness of the material but also the mechanical properties, e.g. hardness, of the anisotropically electroconductive sheet. Thus, it is usual that the thickness of the insulating layer is between 10 $\mu$m and 200 $\mu$m.

Another class of the materials for the insulating layer includes cloths and nets having a suitable mesh size both formed with fine, insulating yarns and threads. The yarns are not limitative but preferably those which have small affinity to moisture, such as glass fiber and synthetic fiber, e.g. nylon or polyester, from the standpoint of stability in a humid atmosphere. Further, the usual thickness of the cloths or nets is between 10 $\mu$m and 300 $\mu$m, and the suitable mesh size of the nets is between 0.1 mm to several mm.

The above-described insulating layer is sandwiched between the electrode and the composite sheet with or without using a small amount of an adhesive.

The mechanism by which electric conduction is obtained through the insulating layer between the electrode and the electroconductive sheet is not sufficiently clear, but it is presumable that the ends of the electroconductive fibers included in the electroconductive sheet come to protrude out of the sheet surfaces when a compressive force is applied between the electrodes and the thickness of the sheet is reduced, so that the protruded ends of the fibers penetrate the insulating layer to reach the surface of the electrode positioned at the other side of the insulating layer contributing to electric conduction between the electrode and the electroconductive sheet. When the compressive force between the electrodes is removed, the above protruded fibers are retracted into the body of the sheet so that the continuity of the insulating layer is regained to establish electric insulation between the electrode and the sheet.

Referring now to FIG. 1, 1 is an anisotropically electroconductive composite sheet, 2, 2 are electrodes, 3, 3 are lead wires for connecting the resistor element to an electric circuit, and 4 is a continuous layer of an insulating material through which electric conduction is obtained by application of a compressive force between both electrodes 2, 2 by means of a suitable contrivance (not shown in the figure).

Figure 2:
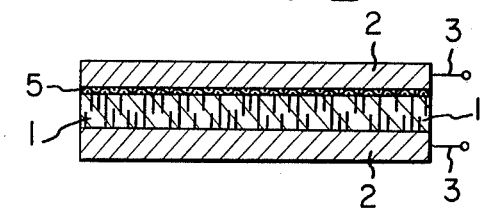
FIG. 2 is a schematic cross-sectional view of a pressure sensitive resistor element of the invention in which an insulating layer of a fine net is provided between an anisotropically electroconductive composite sheet and one of the electrodes.
Figure 3:
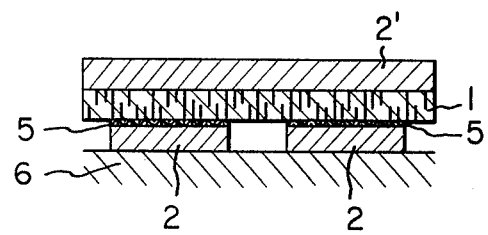
FIG. 3 is a schematic cross-sectional view showing a modification of a pressure sensitive resistor of the invention, which is formed by an integral combination of two separate electrodes placed on one side of an anisotropically electroconductive composite and an electrode placed on the other side.

In FIG. 2, 1, 2, and 3 are the same as in FIG. 1, and 5 is a net formed of fine insulating fibric threads through which electric conduction is obtained by application of a compressive force by means of a suitable contrivance (not shown in the figure).

FIG. 3 shows a further embodiment of the pressure sensitive resistor element by way of a cross-sectional view, in which two electrodes 2, 2 are provided on the same surface of electroconductive sheet 1, pieces of the same net 5, 5 as used in FIG. 2 being interposed between sheet 1 and electrodes 2, 2, and a third electrode 2' is put on the other surface of sheet 1. Electrodes 2 are in contact with a printed circuit board 6. Apply varied compressive forces on electrode 2', then resistance between electrodes 2 and 2 through sheet 1 can be varied according to the compressive force.

The pressure sensitive resistor element of the present invention may be provided with one insulating layer on each surface of the anisotropically electroconductive composite sheet, but it is usually sufficient to have the insulating layer on either one of the surfaces of the composite sheet. The resistor element of the present invention integrated in an electric circuit serves as a switch turned off in the absence of a compressive force or in the presence of a compressive force smaller than a certain critical strength between the electrodes, while it functions as a pressure sensitive rheostat with a compressive force exceeding the critical value so that any on-off switching device can be dispensed with to give a great practical advantage in the increased efficiency of the assembling work as well as in the possibility of miniaturizing the components.

The following examples further illustrate the present invention in order, particularly, to demonstrate the distinctive differences in relationships between the compressive force applied to the pressure sensitive resistor element and the value of the resulting resistance when the insulating layer is present or not for purposes of comparison, and also the differences in the maximum values of resistance when the compressive force is absent or very small.

EXAMPLE 1.

An anisotropically electroconductive material was prepared in the rod form was prepared by mixing 100 parts by weight of a commercial grade silicone rubber compound KE 151U (product of Shin-Etsu Chemical Co., Ltd., Japan), 5 parts by weight of commercial grade carbon filaments Torayca 300A (product of Toray Co., Japan), 10 μm in diameter and 3 mm long, and 1.5 parts by weight of a curing agent C-2 (product of Shin-Etsu Chemical Co., Japan), and applying the mixture to a conventional extruder to form a rod 3 mm in diameter. The rod was then subjected to curing with heat in an oven at 250° C. for 10 minutes.

The thus obtained rod was sliced in a plane perpependicular to the axis. The resulting slices were 0.2 mm thick. One of the slices was sandwiched with two electrodes of platinum plate with 1 mm in diameter using a small amount of an electroconductive adhesive. No insulating layer was interposed between the slice surface and the electrode. Varied compressive forces ranging up to 40 g were applied between the two electrodes, and the value of resistance between the electrodes was measured on each compressive force applied in a conventional manner. The results are shown by Curve A in FIG. 4 which is directed to a comparative test. The relationship between the resistance and the compressive force was very stable and reproducible even after one million cycles of repeated application of the compressive force.

Further, the same sliced composite sheet was coated on one surface with a 20 μm thick layer of a blend of a silicone adhesive KR 101 (product of Shin-Etsu Chemical Co., Japan) and 4% by weight of a curing agent C-1 (product of the same company), followed by curing at 150° C. for 30 minutes and then cooling.

The electric resistance between the electrodes in accordance with the compressive force was measured, with the results as shown by Curve B in FIG. 4. The relationship between the resistance and the compressive force was kept almost unchanged even after one million cycles of repeated application of the compressive force.

As is shown by Curve B of FIG. 4, an insulating resistance was obtained between the electrodes in the absence of the compressive force and in the presence of the compressive force which was smaller than 2.8 g, while, as the compressive force was increased over this critical value, electric conduction was increased also.

EXAMPLE 2.

A fine net formed of polyester filamants, 120 μm thick and having a mesh opening of 200 μm was sandwiched between a surface of the same anisotropically electro-conductive composite sheet as used in Example 1 and a platinum electrode, and another platinum electrode was bonded to the other surface of the sheet using an electroconductive adhesive.

The resistance between the two electrodes was measured in accordance with the compressive force in the same manner as in Example 1, with the results as shown by Curve C in FIG. 4. Curve C was stable and reproducible even after one million cycles of repeated application of the compressive force.

What is claimed is:

1. A pressure sensitive resistor element comprising an anisotropically electroconductive sheet formed of an electrically insulating rubbery elastomer as a matrix, said matrix including a number of electroconductive fibers dispersed and oriented in alignment in a direction substantially perpendicular to the plane of the sheet, an electrode provided on each surface of the sheet and an insulating layer formed of an electrically insulating material interposed between at least one of the electrodes and the sheet, the insulating layer having a thickness sufficient to be insulating in the absence of, and to contribute to electric conduction in the presence of, a compressive force between the electrodes.

2. The pressure sensitive resistor element as claimed in claim 1 wherein the insulating layer is a continuous layer of an electrically insulating material capable of elastic deformation under pressure.

3. The pressure sensitive resistor element as claimed in claim 1 wherein the insulating layer is a cloth formed of electrically insulating filaments.

* * * * *